United States Patent [19]
Abrahamson

[11] Patent Number: 5,899,171
[45] Date of Patent: May 4, 1999

[54] PORTABLE CORRAL PANEL

[76] Inventor: Randy L. Abrahamson, HCR 2, Box 23A, St. John, N. Dak. 58369

[21] Appl. No.: 08/976,756

[22] Filed: Nov. 24, 1997

[51] Int. Cl.[6] .............................. A01K 3/00; E04H 17/00
[52] U.S. Cl. .............................. 119/512; 119/519; 256/31
[58] Field of Search .................................... 119/502, 512, 119/513, 514, 519; 256/31, DIG. 2

[56] References Cited

U.S. PATENT DOCUMENTS

| | | | |
|---|---|---|---|
| 211,498 | 1/1879 | Curry | 256/31 |
| D. 286,690 | 11/1986 | Priefert et al. | D30/2 |
| 359,520 | 3/1887 | Rong | 256/31 |
| 692,991 | 2/1902 | De Witt | 256/31 |
| 1,085,815 | 2/1914 | Logan | 119/513 X |
| 4,349,181 | 9/1982 | Asher et al. | 256/35 |
| 4,924,813 | 5/1990 | Bixler et al. | 119/512 |
| 4,960,074 | 10/1990 | Wilson | 119/512 |
| 5,042,198 | 8/1991 | Privratsky | 49/248 |
| 5,063,876 | 11/1991 | Harris | 119/513 |
| 5,104,074 | 4/1992 | Malloy | 248/156 |
| 5,115,763 | 5/1992 | Wilson | 119/512 |
| 5,139,235 | 8/1992 | Kilmer | 256/36 |
| 5,192,055 | 3/1993 | Griggs et al. | 256/35 |
| 5,356,101 | 10/1994 | Malloy | 248/156 |
| 5,622,021 | 4/1997 | Bookout | 256/31 |
| 5,732,935 | 3/1998 | Codario, Jr. | 256/31 |

*Primary Examiner*—Michael J. Carone
*Assistant Examiner*—Elizabeth Shaw
*Attorney, Agent, or Firm*—Zarley, McKee, Thomte Voorhees & Sease; Dennis L. Thomte

[57] ABSTRACT

A portable corral panel is disclosed and which has a supporting leg structure pivotally secured to one side thereof with the supporting leg structure being pivotally movable from a stored position adjacent the panel member to an outwardly extending supporting position. An anchor plate is secured to the supporting leg structure to enable an anchor pin to be inserted therethrough into the ground to further stabilize the panel member.

11 Claims, 5 Drawing Sheets

PORTABLE CORRAL PANEL

BACKGROUND OF THE INVENTION

1. Field of the Invention

This invention relates to a portable corral panel and more particularly to a portable corral panel having a supporting leg structure pivotally secured thereto which may be folded from a supporting position to a stored position.

2. Description of the Related Art

Many types of portable corrals and corral panels have been previously described. For example, see U.S. Pat. No. 4,924,813 to Bixler et al.; U.S. Pat. No. 4,960,074 to Wilson; U.S. Pat. No. 5,063,876 to Harris; U.S. Pat. No. 5,115,763 to Wilson; and U.S. Pat. No. Des. 286,690 to Priefert. Portable corrals for the containment of livestock normally consist of a plurality of portable corral panels which are connected together in an end-to-end relationship. Although the portable corral panels of the prior art may be generally satisfactory, it is believed that the portable corral panels of the prior art do not have the requisite stability in use and if they are provided with some form of supporting structure, that supporting structure is not convenient to use and is not easily stored.

SUMMARY OF THE INVENTION

A portable corral panel is disclosed and which has an upper end, a lower end, opposite sides and opposite ends. First, second and third brace members are provided for supporting the panel member in an upright condition when the panel member is used with other panel members to form a portable corral. The upper end of the first brace member is pivotally secured, about a substantially vertical axis, to the panel member at one side thereof. A second elongated brace member having upper and lower ends is also provided with the upper end of the second brace member being pivotally secured, about a substantially vertical axis, to the panel member below the pivotal connection of the first brace member with the panel member. The lower ends of the first and second brace members are operatively secured together and have an anchor plate secured thereto which has an opening formed therein into which an anchor pin may be inserted. A third brace having upper and lower ends has its upper end selectively removably connected to the panel member laterally of the pivotal connections of the first and second brace members with the panel member and has its lower end operatively pivotally secured to the first and second brace members at the lower ends thereof. When the first and second brace members have been pivoted outwardly from the panel member to a supporting position and when the upper end of the third brace member has been pivotally connected to the panel member, the first, second and third brace members cooperate to form a supporting leg structure for the panel member. When it is desired to fold the supporting leg structure to a stored position, the upper end of the third brace member is disconnected from the panel member and the brace members are pivotally moved to a position adjacent the side of the panel member. An anchor pin chain is wrapped around the brace members and a portion of the panel to secure the brace members in a stored condition.

It is therefore a principal object of the invention to provide an improved portable corral panel.

Yet another object of the invention is to provide an improved supporting leg structure for a portable corral panel.

Yet another object of the invention is to provide a supporting leg structure for a portable corral panel which is easily pivotally moved from a stored condition adjacent the panel member to a supporting position and vice versa.

Yet another object of the invention is to provide a means for maintaining the supporting leg structure of a portable corral panel in a stored condition.

These and other objects will be obvious to those skilled in the art.

DESCRIPTION OF THE PREFERRED EMBODIMENT

Figure 1:
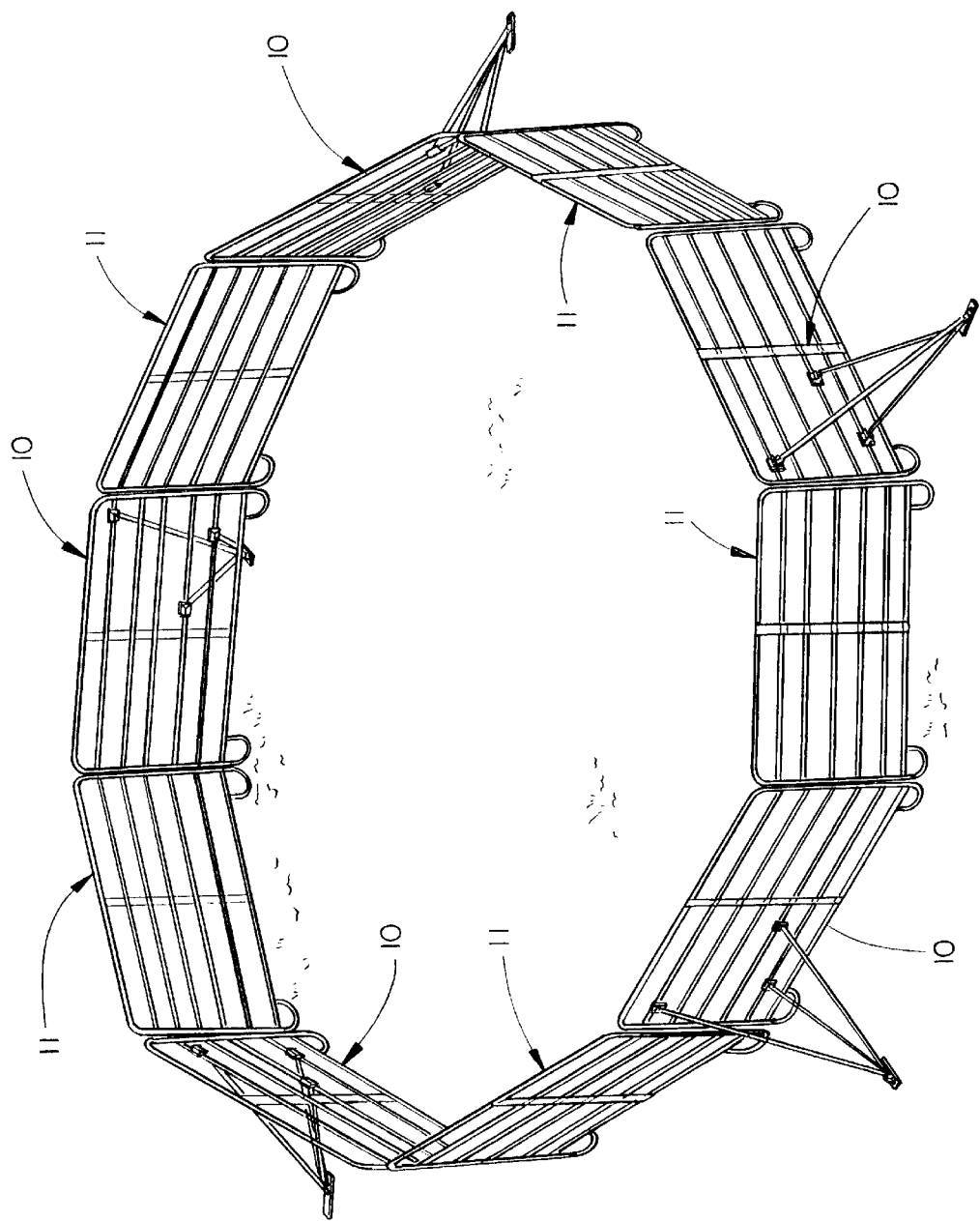
FIG. 1 is a perspective view illustrating a plurality of the portable corral panels of this invention being utilized to form a portable corral.

The portable corral panel of this invention is referred to generally by the reference numeral 10. As seen in FIG. 1, a plurality of the panels 10 may be connected to other panels 11 in conventional fashion to form a portable corral.

For purposes of description, panel 10 will be described as having an upper end 12, lower end 14, opposite ends 16 and 18, and opposite sides 20 and 22.

Figure 5:
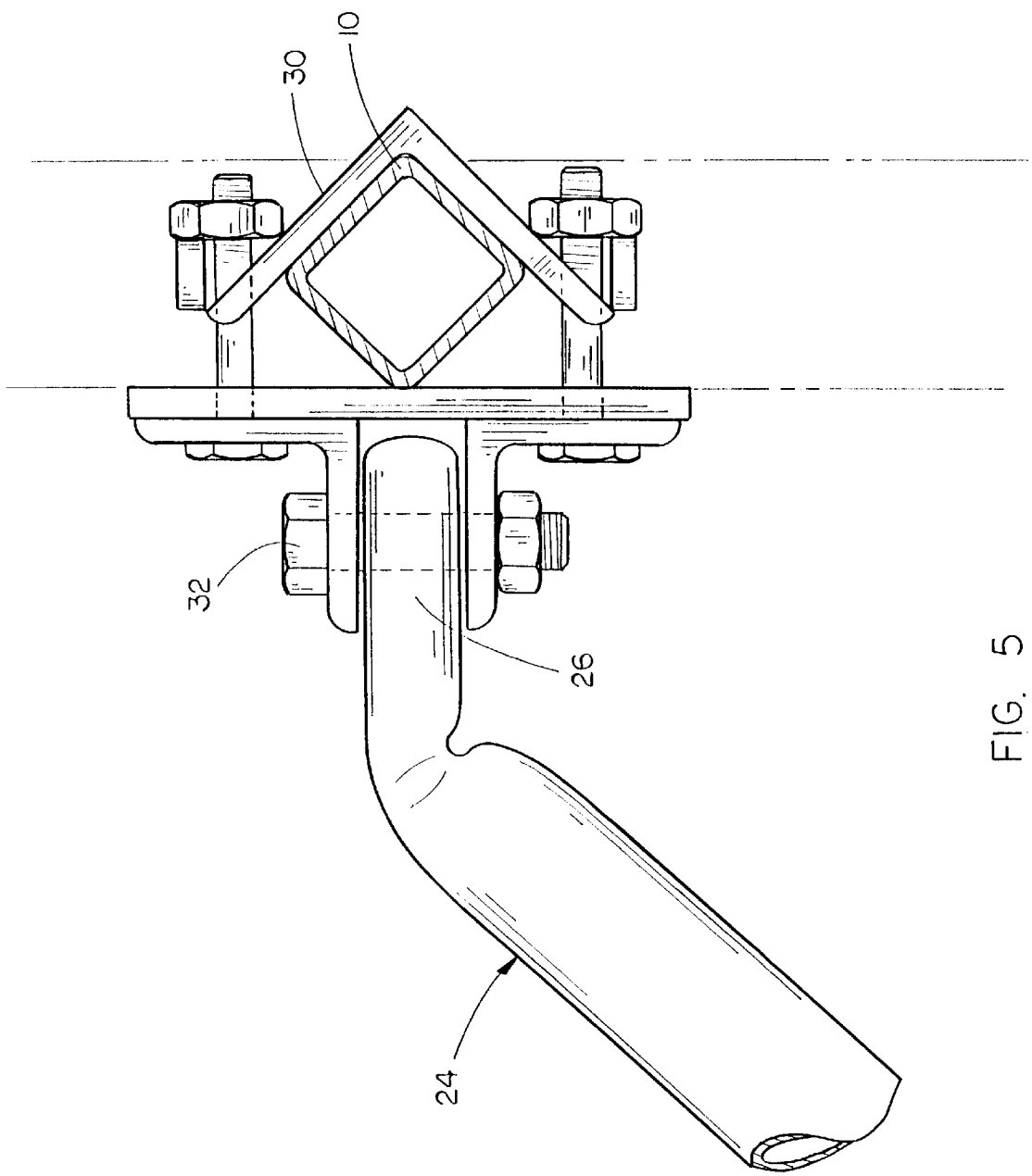
FIG. 5 is a sectional view illustrating the manner in which one of the brace members is secured to the panel.

The numeral 24 refers to a first elongated brace member having an upper end 26 and a lower end 28. The upper end 26 of brace member 24 is pivotally connected, about a substantially vertical axis, to a connector assembly 30 which is clamped onto one of the horizontal members of the panel 10. As seen in FIG. 5, bolt 32 provides the pivotal connection between the upper end 26 of brace member 24 and connector assembly 30. The lower end 28 of brace member 24 is welded or otherwise secured to a flat anchor plate 34 having an anchor pin opening 36 formed therein. Anchor pin 38 is adapted to be inserted through the opening 36 in anchor plate 34 to stabilize the assembly, as will be described in more detail hereinafter, and is connected to brace 24 by means of chain 40. Brace member 24 is also provided with an anchor pin holder 42 having an opening 44 formed therein which is adapted to receive anchor pin 38 therein, as will be described in more detail hereinafter.

The numeral 46 refers to a second brace member having an upper end 48 and a lower end 50. The lower end 50 of brace member 46 is welded or otherwise secured to the lower end 28 of brace member 24 and to the anchor plate 34. The upper end 48 of brace member 46 is pivotally connected, about a substantially vertical axis, to connector assembly 52 which is clamped onto the panel 10 below the connector assembly 30. Bolt 54 provides the pivotal connection between brace 46 and connector assembly 52, as seen in the drawings.

The numeral 56 refers to a third brace member having an upper end 58 and a lower end 60. The lower end 60 of brace member 56 is hingedly or pivotally secured to rod 62 which is secured to and which extends between brace members 24 and 46. The upper end 58 of brace member 56 is adapted to be selectively connected to connector assembly 64 which is secured to panel 10 laterally of the connector assemblies 30 and 52, as seen in the drawings. Pin 66 is adapted to extend through opening 67 in upper end 58 of brace member 56 to connect the brace member 56 and the connector assembly 64. Pin 66 has a chain 70 secured thereto which is secured to brace member 56 to prevent the pin 66 from becoming lost.

Figure 2:
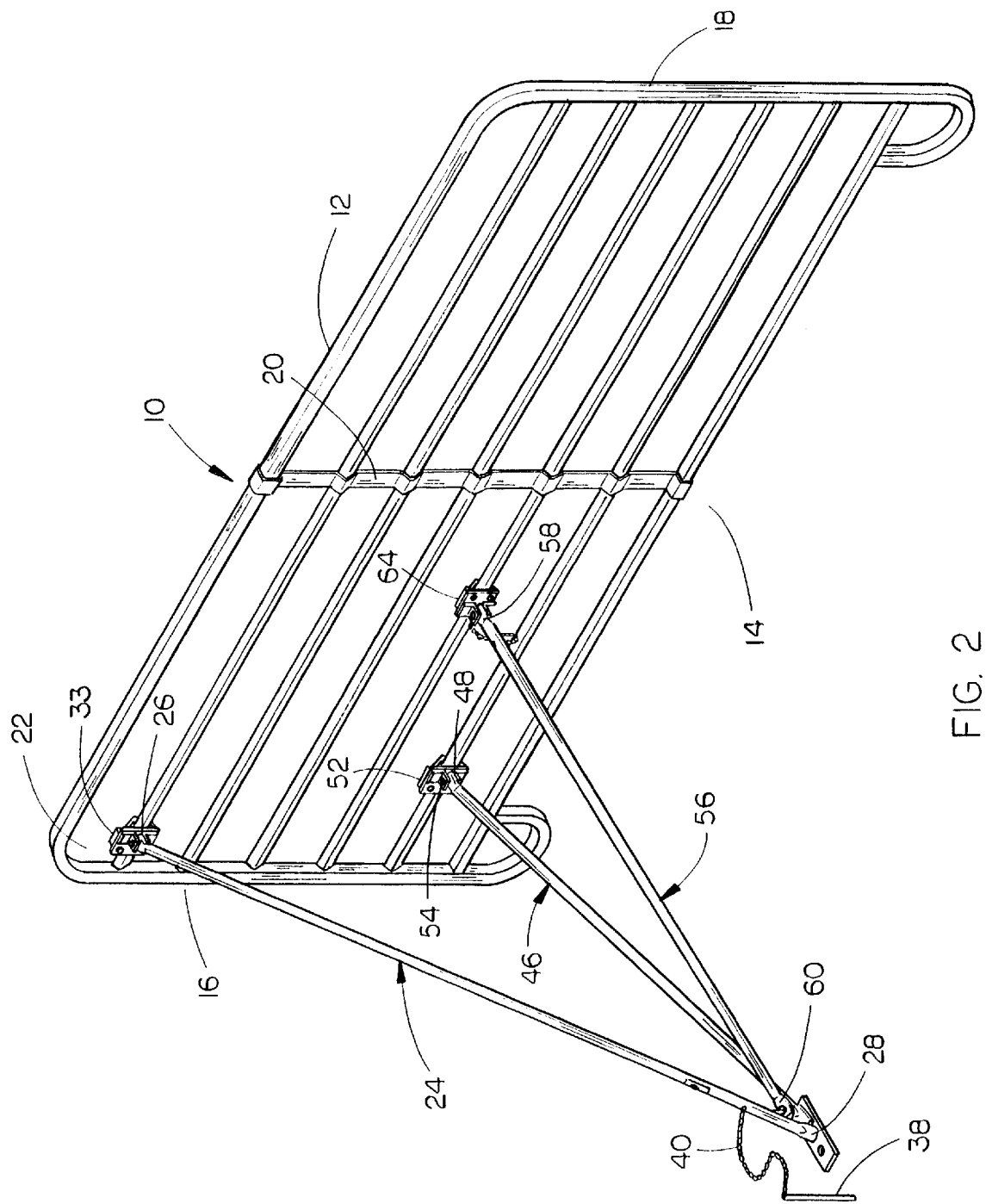
FIG. 2 is a perspective view of the portable corral panel of this invention.

When it is desired to support the panel 10 by means of the supporting leg structure just described, brace members 26 and 46 are pivotally moved with respect to panel 10 so that they extend outwardly and downwardly from panel 10, as seen in FIG. 2. The upper end 58 of brace member 56 is then connected to connector assembly 64 by means of the pin 66. Anchor pin 38 is then extended downwardly through opening 36 into the ground to further stabilize the structure. Thus, when the brace members are in their supporting position, the panel 10 will be supported in its upright condition and will be very stable.

Figure 3:
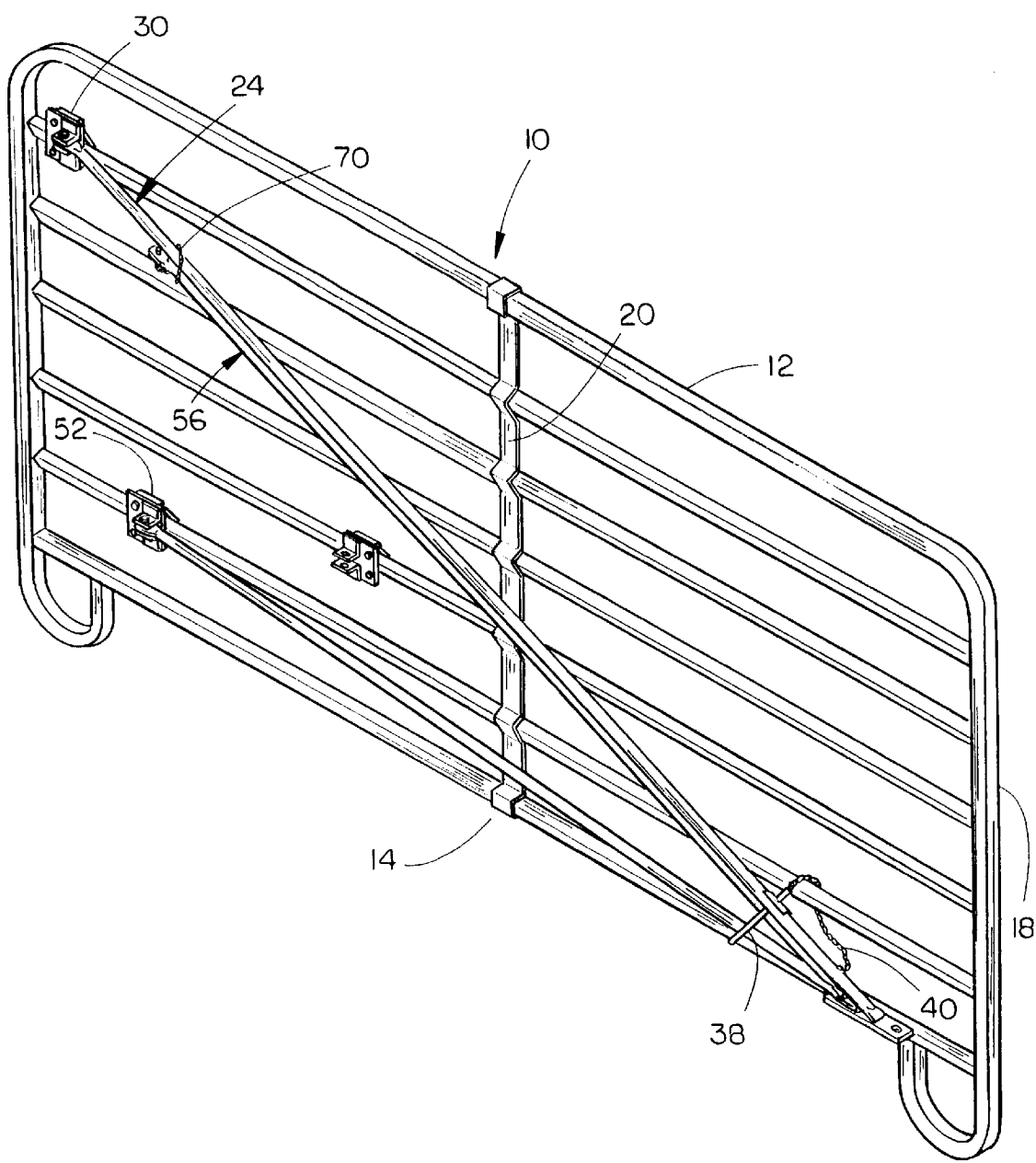
FIG. 3 is a view similar to FIG. 2 except that the supporting leg structure has been pivotally moved to a stored position.
Figure 4:
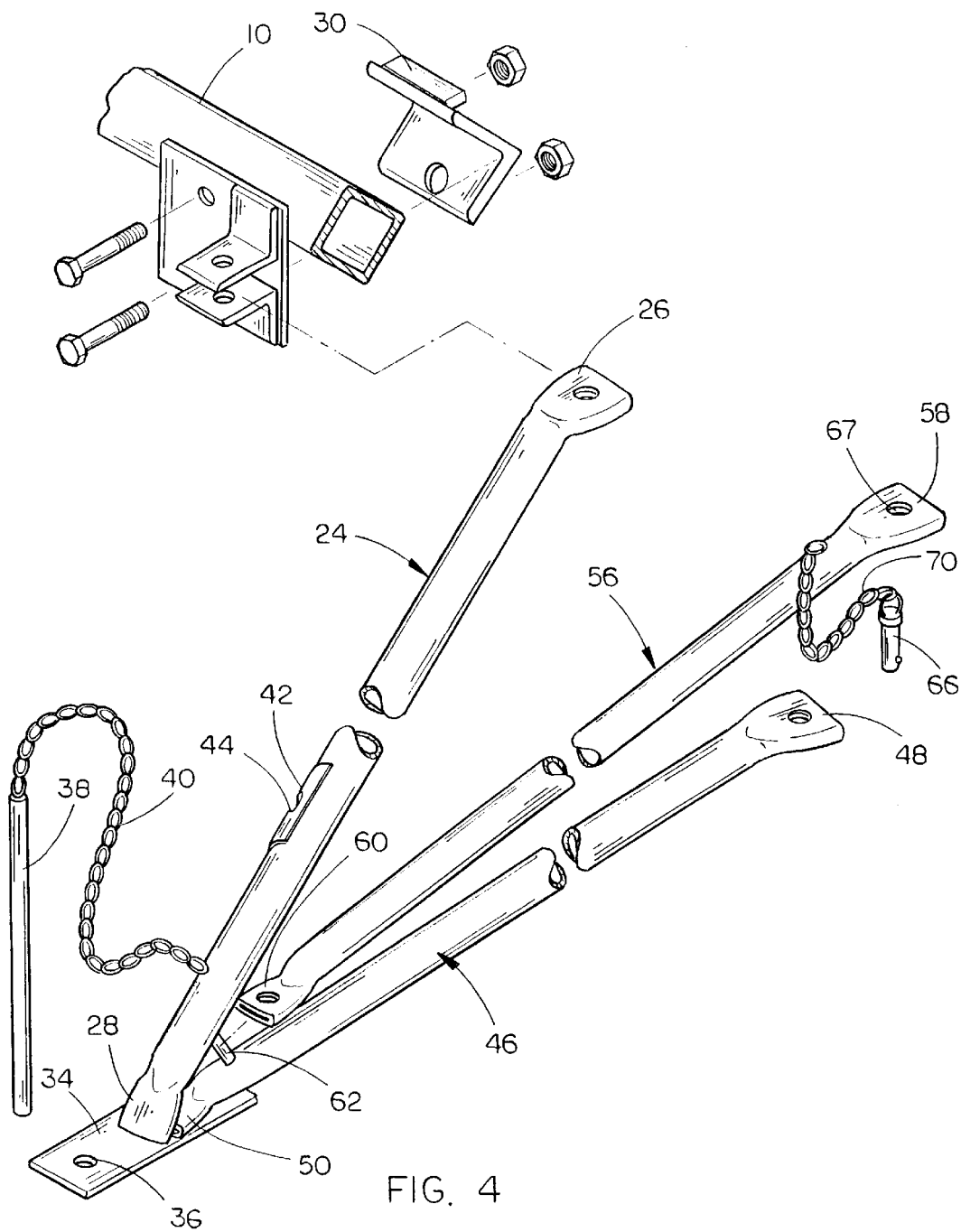
FIG. 4 is a partial exploded perspective view of the supporting leg structure.

When it is desired to store or transport the panel 10, anchor pin 38 is removed from the ground and opening 36. Pin 66 is then removed from connector assembly 64. Brace members 24, 56 and 46 are then pivotally moved so that they are substantially positioned adjacent the side of the panel 10, as seen in FIG. 3. The chain 40 may then be wrapped around a portion of the panel 10 and the inserted through opening 44 in anchor pin holder 42 to positively maintain the brace members in their stored condition. It is also recommended that the chain 70 be wrapped around brace members 24 and 56 and pin 66 and then inserted into the opening 67 in the upper end 58 of brace member 56 to maintain brace member 56 in the stored condition.

Although it has been described that the anchor pin 38 is secured to the brace member 24 by the chain 40, it should be understood that the pin 38 could be alternatively secured to one of the other brace members, if so desired. Additionally, while the anchor pin holder 42 has been described as being mounted on brace member 24, the anchor pin holder 42 could be secured to one of the other brace members, if so desired. Additionally, although it is described that the lower end of brace member 46 is secured to the anchor plate 34, the lower end of the brace member 46 could be secured to the lower end of the brace member 24, if so desired. Similarly, while it has been described that the lower end of brace member 24 is secured to anchor plate 34, the lower end of brace member 24 could be secured to brace member 46 near the lower end thereof with the lower end of brace member 46 being secured to the anchor plate 34. It should also be noted that although the supporting leg structure is ideally suited for use with a corral panel, it is conceivable that the structure could be used on other members requiring support in an upright condition.

Thus, it can been seen that the invention accomplishes at least all of its stated objectives.

I claim:

1. A portable corral panel, comprising:

a panel member having an upper end, a lower end, opposite sides and opposite ends;

a first elongated brace member having upper and lower ends;

said upper end of said first brace member being pivotally secured, about a substantially vertical axis, to said panel member at one side thereof;

a second elongated brace member having upper and lower ends;

said upper end of said second brace member being pivotally secured, about a substantially vertical axis, to said panel member at said one side thereof below the pivotal connection of said first brace member with said panel member;

a third elongated brace member having upper and lower ends;

said upper end of said third elongated brace member being selectively removably connected to said panel member laterally of the pivotal connections of said first and second brace member with said panel member;

said lower end of said third brace member being operatively pivotally secured to at least one of said first and second brace members between the ends thereof;

said first and second brace members being selectively pivotally movable, with respect to said panel member, from a stored position adjacent said one side of said panel member, to an outwardly extending supporting position;

said first, second and third brace members cooperating to form a supporting brace structure for said panel member when said first and second brace members are pivoted outwardly to said supporting position and said upper end of said third brace member is secured to said panel member;

said third brace member being selectively movable, with said first and second brace members, from a supporting position to a stored position after said upper end thereof has been disconnected from said panel member.

2. The portable corral panel of claim 1 wherein an anchor plate is secured to at least the lower end of said first brace member and wherein said anchor plate has an anchor pin opening formed therein for receiving a ground engaging anchor pin therein.

3. The portable corral panel of claim 2 wherein a first chain is operatively connected to said first brace member and wherein an anchor pin is secured to said first chain.

4. The portable corral panel of claim 3 wherein an anchor pin holder is secured to said first brace member for reception of said anchor pin therein when said first, second and third brace members are in their stored position.

5. The portable corral panel of claim 4 wherein said first chain has a length sufficient to enable it to be wrapped around a portion of said panel member, when said brace members are in their stored position, to maintain said brace members in their said stored position, said anchor pin being received in said anchor pin holder, when said first chain is wrapped around said panel member, to maintain said first chain in its said wrapped condition.

6. The portable corral panel of claim 1 wherein said lower end of said second brace is secured to said lower end of said first brace and wherein said lower end of said third brace member is pivotally secured to both of said first and second brace members adjacent the lower ends thereof.

7. A supporting brace structure for an upstanding member having an upper end and a lower end, comprising:

a first elongated brace member having upper and lower ends;

said upper end of said first brace member being pivotally secured, about a substantially vertical axis, to said upstanding member;

a second elongated brace member having upper and lower ends;

said upper end of said second brace member being pivotally secured, about a substantially vertical axis, to said upstanding member below the pivotal connection of said first brace member with said upstanding member;

a third elongated brace member having upper and lower ends;

said upper end of said third elongated brace member being selectively removably connected to said upstanding member laterally of the pivotal connections of said first and second brace member with said upstanding member;

said lower end of said third brace member being operatively pivotally secured to at least one of said first and second brace members between the ends thereof;

said first, second and third brace members cooperating to form a supporting brace structure for said upstanding member when said first and second brace members are pivoted outwardly to a supporting position and said upper end of said third brace member is secured to said upstanding member.

8. The structure of claim 7 wherein an anchor plate is secured to at least the lower end of said first brace member and wherein said anchor plate has an anchor pin opening formed therein for receiving a ground engaging anchor pin therein.

9. The structure of claim 8 wherein a first chain is operatively connected to said first brace member and wherein an anchor pin is secured to said first chain.

10. The structure of claim 9 wherein an anchor pin holder is secured to said first brace member for reception of said anchor pin therein at times.

11. The structure of claim 10 wherein said lower end of said second brace is secured to said lower end of said first brace and wherein said lower end of said third brace member is pivotally secured to both of said first and second brace members adjacent the lower ends thereof.

* * * * *